US011082578B2

(12) United States Patent
Behlis

(10) Patent No.: US 11,082,578 B2
(45) Date of Patent: Aug. 3, 2021

(54) IMAGE CAPTURE AND TRANSFER SYSTEM

(71) Applicant: DOSL, LLC, Arlington Heights, IL (US)

(72) Inventor: Voula Behlis, Arlington Heights, IL (US)

(*) Notice: Subject to any disclaimer, the term of this patent is extended or adjusted under 35 U.S.C. 154(b) by 0 days.

(21) Appl. No.: 16/580,514

(22) Filed: Sep. 24, 2019

(65) Prior Publication Data
US 2020/0099818 A1 Mar. 26, 2020

Related U.S. Application Data

(60) Provisional application No. 62/735,473, filed on Sep. 24, 2018.

(51) Int. Cl.
*H04N 1/32* (2006.01)
*H04N 5/232* (2006.01)
*H04N 1/00* (2006.01)

(52) U.S. Cl.
CPC ..... *H04N 1/32128* (2013.01); *H04N 1/00196* (2013.01); *H04N 1/00244* (2013.01); *H04N 1/00307* (2013.01); *H04N 1/00312* (2013.01); *H04N 5/23293* (2013.01); *H04N 2201/3214* (2013.01); *H04N 2201/3277* (2013.01)

(58) Field of Classification Search
CPC ........... H04N 5/23293; H04N 5/23216; H04N 5/2628; H04N 5/265; H04N 1/00244; H04N 1/00307; H04N 1/00196; H04N 1/00312; H04N 1/32101; H04N 1/32128; H04N 2101/00; H04N 2201/3214; H04N 2201/3253; H04N 2201/3277; H04N 2201/3278; G01C 21/3635; G01C 21/3647; G01C 21/3673; G01C 21/00; G06F 3/017; G06F 3/0346; G06F 3/04817; G06F 3/0482; G06F 3/04842; G06F 21/32; G06F 21/35; G06K 9/00476; G06K 2209/01; G06K 2209/03; G06K 9/18; G06K 9/3258; G06K 9/6215; G09G 2340/125; G09G 2340/14; G09G 2380/10; G09G 5/14; G09G 5/377; G06Q 20/206; G06Q 20/22; G06Q 20/3221; G06Q 20/40145; G06Q 20/4016; G06Q 40/08
USPC ........................................................ 358/471
See application file for complete search history.

(56) References Cited

U.S. PATENT DOCUMENTS

| | | | |
|---|---|---|---|
| 8,260,674 B2* | 9/2012 | David | G06Q 30/02 705/26.5 |
| 9,818,154 B1* | 11/2017 | Wilbert | G06K 9/325 |
| 10,572,758 B1* | 2/2020 | Wilbert | G06T 3/40 |
| 10,678,849 B1* | 6/2020 | Ouimet | G06N 3/0454 |
| 10,867,327 B1* | 12/2020 | Wilbert | G06Q 30/0611 |
| 2007/0047008 A1* | 3/2007 | Graham | G06K 9/325 358/401 |
| 2008/0238409 A1* | 10/2008 | Peschke | G01R 1/06788 324/149 |

(Continued)

*Primary Examiner* — Negussie Worku
(74) *Attorney, Agent, or Firm* — KCO Legal, Inc.

(57) ABSTRACT

An image connection system including an information gathering unit that gathers information on an image to be captured, an image requesting unit that requests the capture of an image from at least one mobile communication device at a predetermined location for a predetermined fee, an image routing device that routes an image form at least one mobile communication device to the requesting device.

20 Claims, 3 Drawing Sheets

(56) References Cited

U.S. PATENT DOCUMENTS

| | | | | |
|---|---|---|---|---|
| 2010/0125509 | A1* | 5/2010 | Kranzley | G06Q 40/00 |
| | | | | 705/17 |
| 2012/0092509 | A1* | 4/2012 | Kim | G06F 3/04817 |
| | | | | 348/207.1 |
| 2012/0221230 | A1* | 8/2012 | Reilhac | G08G 1/096716 |
| | | | | 701/117 |
| 2013/0104189 | A1* | 4/2013 | Drako | H04L 51/12 |
| | | | | 726/1 |
| 2013/0322634 | A1* | 12/2013 | Bennett | G10L 21/00 |
| | | | | 381/17 |
| 2014/0082467 | A1* | 3/2014 | Yoon | G06F 40/114 |
| | | | | 715/202 |
| 2014/0192134 | A1* | 7/2014 | Jung | G06K 9/00255 |
| | | | | 348/14.02 |
| 2016/0098101 | A1* | 4/2016 | Park | G01C 21/3635 |
| | | | | 345/634 |
| 2016/0364718 | A1* | 12/2016 | Betancourt | G07F 13/025 |
| 2017/0199711 | A1* | 7/2017 | Kim | G06F 3/1236 |
| 2017/0286928 | A1* | 10/2017 | Griffin | G06K 9/00442 |
| 2018/0122155 | A1* | 5/2018 | Barreira Avegliano | |
| | | | | G07B 15/06 |
| 2018/0373936 | A1* | 12/2018 | Kim | G06Q 30/0284 |
| 2019/0197815 | A1* | 6/2019 | Kamal | H04L 63/0823 |
| 2019/0205667 | A1* | 7/2019 | Avidan | G06N 3/08 |

* cited by examiner

IMAGE CAPTURE AND TRANSFER SYSTEM

Cross-Reference to Related Applications

The present disclosure claims the benefit of and the priority from U.S. Provisional Patent Application No. 62/735,473, filed Sep. 24, 2019, which is incorporated by reference in its entirety.

BACKGROUND OF THE INVENTION

With the wide spread adoption of mobile phones and tablet computers, information can be disseminated to large groups of people instantaneously. In addition, users of mobile devices are located at many locations throughout the world. Typically, the dissemination of information is controlled by the user of a mobile device. A user of a mobile device may upload images to a third party web site for others to access and view.

When capturing an image or a video, the user picks the location of the image, the subject of the image and where the image will be shown. A viewer of the image has no control of the image or location where the image is captured. A need exists for a system that will allow viewers of images to select the location and subject of captured images.

SUMMARY OF THE INVENTION

Systems, methods, features, and advantages of the present invention will be or will become apparent to one with skill in the art upon examination of the following figures and detailed description. It is intended that all such additional systems, methods, features, and advantages be included within this description, be within the scope of the invention, and be protected by the accompanying claims.

One embodiment of the present disclosure includes an image connection system including an information gathering unit that gathers information on an image to be captured, an image requesting unit that requests the capture of an image from at least one mobile communication device at a predetermined location for a predetermined fee, an image routing device that routes an image form at least one mobile communication device to the requesting device.

In another embodiment, the image request includes an amount of a fee to be paid to transmit the captured image.

In another embodiment, the image routing unit does not route the image until confirmation of payment of the fee is received.

In another embodiment, the information gathering unit collects the information from each of the at least one mobile communication devices.

In another embodiment, a first of the at least one mobile communication device rejects the request to the image.

In another embodiment, the image requesting unit transmits the request to multiple mobile communication units at once.

In another embodiment, the image requesting device transmits instructions for a user of the mobile communication device related to the position of the user in relation to an object.

In another embodiment, the fee is a time based fee to gather a plurality of images.

In another embodiment, the fee is paid after the images are transferred.

In another embodiment, a user requesting the images selects the mobile device where the request is sent.

Another embodiment of the present disclosure includes a method of collecting an image by and image connection system including a processor and a memory, with a program operating in the memory that performs the steps of gathering information on an image to be captured via an information gathering unit, requesting the capture of an image from at least one mobile communication device at a predetermined location for a predetermined fee via an image requesting unit, routing an image from at least one mobile communication device to the requesting device via an image routing unit.

In another embodiment, the image request includes an amount of a fee to be paid to transmit the captured image.

Another embodiment includes the step of not transmitting the fee until confirmation of payment of the fee is received.

Another embodiment includes the step of the information from each of the at least one mobile communication devices.

In another embodiment, a first of the at least one mobile communication device rejects the request to the image.

Another embodiment includes the step of transmitting the request to multiple mobile communication units at once.

Another embodiment includes the step of transmitting instructions for a user of the mobile communication device related to the position of the user in relation to an object.

In another embodiment, the fee is a time based fee to gather a plurality of images.

In another embodiment, the fee is paid after the images are transferred.

In another embodiment, a user requesting the images selects the mobile device where the request is sent.

BRIEF DESCRIPTION OF THE DRAWINGS

The accompanying drawings, which are incorporated in and constitute a part of this specification, illustrate an implementation of the present invention and, together with the description, serve to explain the advantages and principles of the invention. In the drawings.

DETAILED DESCRIPTION OF THE INVENTION

Figure 1:
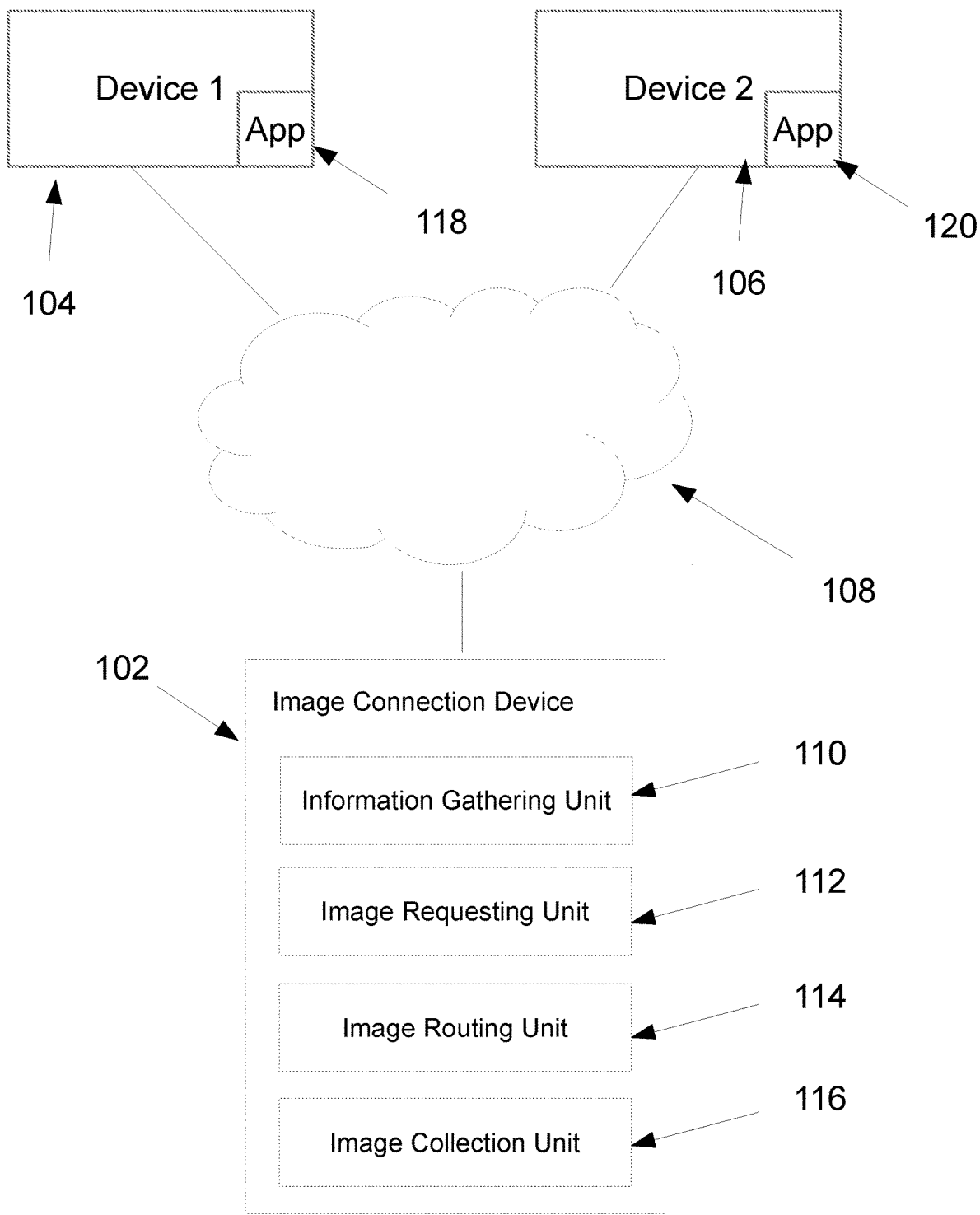
FIG. 1 depicts one embodiment of an image connection system 100 consistent with the present invention.

Referring now to the drawings which depict different embodiments consistent with the present invention, wherever possible, the same reference numbers will be used throughout the drawings and the following description to refer to the same or like parts.

The image connection system 100 connects two remote devices located in different locations and negotiates the transfer of real time images from one device to the other. The image connection system receives a request to stream live images from a location and presents the locations of the available remote devices to the requester. The requester can select any of the remote devices for streaming. After selecting a remote device, the user of the selected remote device is alerted that they have received a request to stream live images. The selected user may agree to stream images, reject the offer to stream images, or counter offer the amount paid to stream images. If the requesting user and selected device user agree to the price to stream images, the selected user begins streaming the images.

FIG. 1 depicts one embodiment of an image connection system 100 consistent with the present invention. The image connection system 100 includes an image connection device 102, a communication device #1 104, and a communication device #2 106 each communicatively connected via a network 108. The image connection system 100 further includes an information gathering unit 110, an image requesting unit 112, an image routing unit 114 and an image collection unit 116.

The information gathering unit 110 and image requesting unit 112 may be embodied by one or more servers. Alternatively, each of the image routing unit 114 and image collection unit 116 may be implemented using any combination of hardware and software, whether as incorporated in a single device or as a functionally distributed across multiple platforms and devices.

In one embodiment, the network 108 is a cellular network, a TCP/IP network, or any other suitable network topology. In another embodiment, the commodity verification device 102 may be servers, workstations, network appliances or any other suitable data storage devices. In another embodiment, the communication devices 104 and 106 may be any combination of cellular phones, telephones, tablets or any other suitable communication devices. The communication devices 104/106 may include apps 118/120 that enable each communication device 104/106 to connect to one or more communication devices 104/106 directly over the network 108. In one embodiment, the network 102 may be any private or public communication network known to one skilled in the art such as a local area network ("LAN"), wide area network ("WAN"), peer-to-peer network, cellular network or any suitable network, using standard communication protocols. The network 108 may include hardwired as well as wireless branches.

Figure 2:
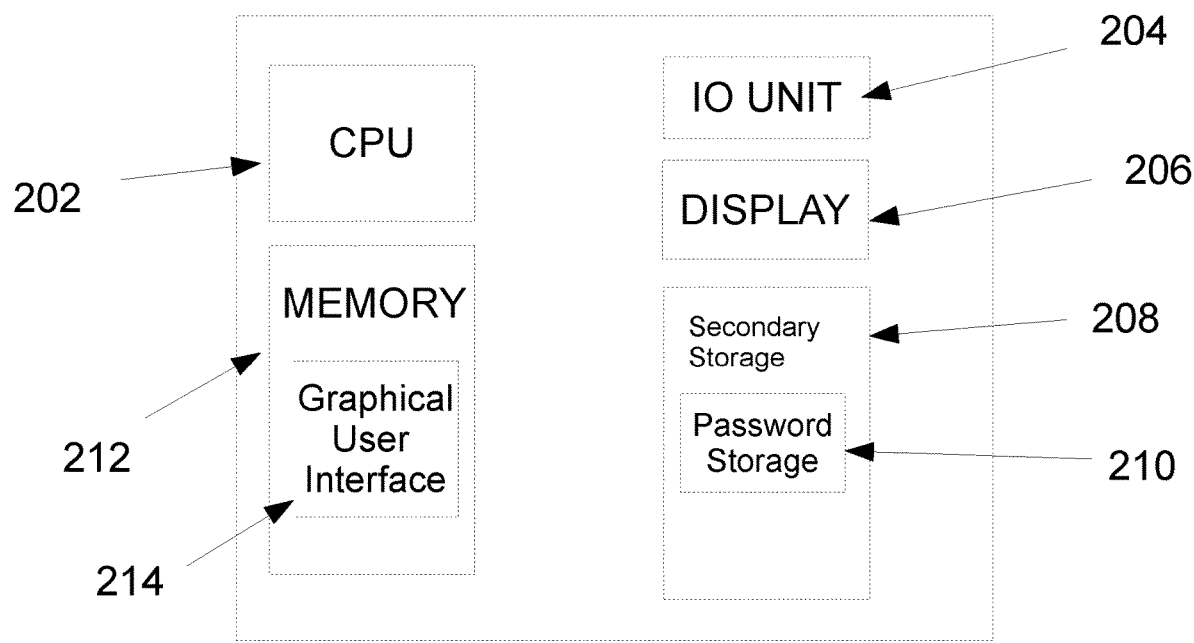
FIG. 2 depicts one embodiment of an image connection device 102.

FIG. 2 depicts one embodiment of an image connection device 102. The image connection device 102 includes a network I/O device 204, a processor 202, a display 206 and a secondary storage 208 running an image storage unit 210 and a memory 212 running a graphical user interface 214. The information gathering unit 112, operating in memory 208 of the image connection device 102, is operatively configured to send and receive communications between a remote devices via the network 108. In one embodiment, the processor 202 may be a central processing unit ("CPU"), an application specific integrated circuit ("ASIC"), a microprocessor or any other suitable processing device. The memory 212 may include a hard disk, random access memory, cache, removable media drive, mass storage or configuration suitable as storage for data, instructions, and information. In one embodiment, the memory 208 and processor 202 may be integrated. The memory may use any type of volatile or non-volatile storage techniques and mediums. The network I/O line 204 device may be a network interface card, a cellular interface card, a Bluetooth interface card, an ASCII interface card, or any other suitable network interface device.

Figure 3:
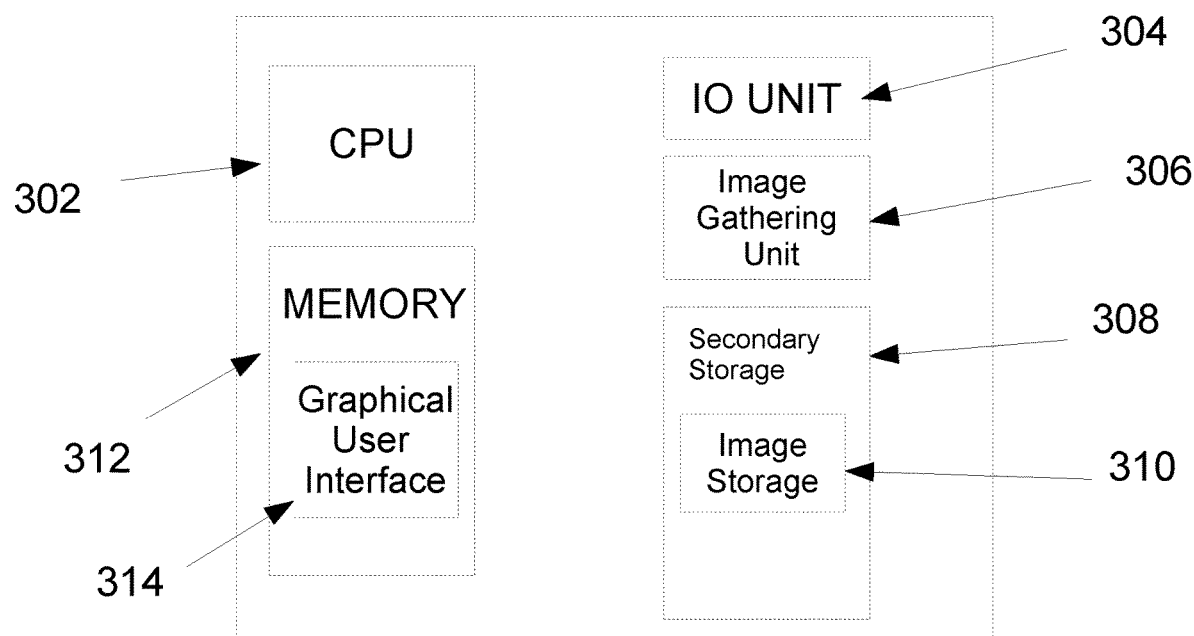
FIG. 3 depicts one embodiment of a communication device 104/106 consistent with the present invention.

FIG. 3 depicts one embodiment of a communication device 104/106 consistent with the present invention. The communication device 104/106 includes a processor 302, a network I/O unit 304, an image capture unit 306, a secondary storage unit 308 including an image storage device 310, and memory 312 running a graphical user interface 314. In one embodiment, the processor 302 may be a central processing unit ("CPU"), an application specific integrated circuit ("ASIC"), a microprocessor or any other suitable processing device. The memory 312 may include a hard disk, random access memory, cache, removable media drive, mass storage or configuration suitable as storage for data, instructions, and information. In one embodiment, the memory 312 and processor 302 may be integrated. The memory may use any type of volatile or non-volatile storage techniques and mediums. The network I/O device 304 may be a network interface card, a plain old Bluetooth interface card, an ASCII interface card, or any other suitable network interface device. The communication 104/106 may also operate software in the memory that directly connects a first communication device 104/106 to a second communication device 104/106.

In one embodiment, the network 108 may be any private or public communication network known to one skilled in the art such as a Local Area Network ("LAN"), Wide Area Network ("WAN"), Peer-to-Peer Network, Cellular network or any suitable network, using standard communication protocols. The network 108 may include hardwired as well as wireless branches.

Figure 4:
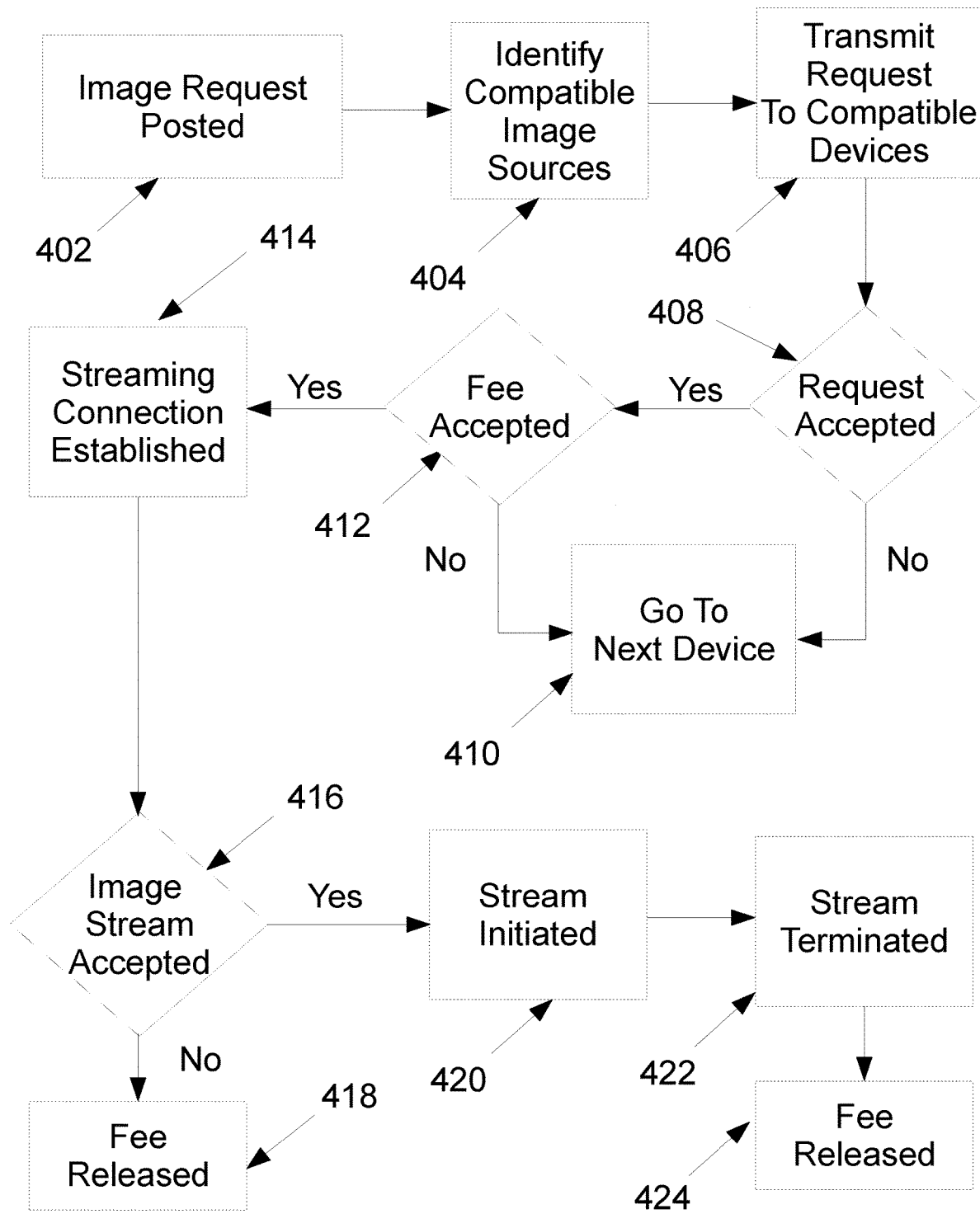
FIG. 4 depicts a schematic representation of a process performed by the image connection device 102.

FIG. 4 depicts a schematic representation of a process performed by the image connection device 102. In step 402, the information gathering unit 110 receives a request to stream live images to a remote communication device 104/106. The request may include information on the request including the desired location of the remote communication device 104/106, the amount the requester will pay for the streaming, the duration of the streaming, and any other information related to the images to be streamed. In step 404, the image routing unit 114 identifies communication devices 104/106 within a specific distance of the desired location. The location of the communication devices 104/106 may be transmitted on regular intervals via the applications 118/120 operating in the communication device 104/106.

In step 406, a request is sent to devices in the proximity of the location requested by the user by the image requesting unit 112. The request may include information on the exact location the user would like to receive images from, the amount to be paid to stream the images and the duration the images will be streamed. The image requesting unit 112 may transmit the request to the applications 118/120 operating in the remote communication units 104/106. In one embodiment, the image requesting unit 112 sends a request to a communication device 104/106 selected by the requesting device. As an illustrative example, the image requesting unit 112 may display all available communication devices 104/106 within a predetermined distance of the desired location on a map. A user may select a specific communication unit 104/106 on the map. The image requesting device 102 may transmit the request to only the communication unit 104/106 selected by the user.

In step 408, the image requesting unit 112 determines if the request has been accepted by the communication device 104/106. In step 410, if the request is not accepted, the image requesting unit 112 transmits the request to the next communication device 104/106 closest to the desired location. The image requesting unit 112 gathers information on which device to select as the next communication device 104/106 based on a user input, geographic information or any other factor that can be used to determine the next communication device 104/106. In step 412, if the request is accepted, the communication device 104/106 determines if the fee associated with the request has been accepted. The communication device 104/106 may accept the request, deny the request or make a counter offer for the amount paid for the streaming or the duration. If the fee is rejected by the user or the receiving device, the process moves to step 410 and a new device is selected. In step 414, a streaming connection between the requesting user's communication device 104/106 and the paid user's device 104/106 is established. In one embodiment, the two communication devices 104/106 connect directly together over the network 108 via the applications 118/120 on each communication device 104/106. Consistent with this embodiment, each communication device receives a unique identifier for the communication device 104/106 to be contacted.

In step 416, the transmitting communication device 104/106 accepts the request to stream images from the requesting communication device 104/106. In step 418, the fee to be paid the to the transmitting communication device 104/106 is collected by the image collection unit 116 and is held until the streaming is complete. In one embodiment, a notification may be sent to the transmitting communication device 104/106 notifying the user that the fee has been collected. In step 420, after the fee is collected, the streaming of the images initiates. In step 420, the image stream terminates based on the agreement between the parties. In step 422, after the image stream terminates, the fee is transferred to the transmitting communication device 104/106.

During the streaming of images between the devices, the text and audio communications may be sent to between the units to coordinate the images sent by the transmitting device. As an illustrative example, the receiving device may transmit an audio or text message to the transmitting device instructing the user of the transmitting device to point the image capture in a different direction, turn on a light or any other communication. In one embodiment, the fee is paid on a per time basis, such as per minute or per second basis. In another embodiment, the fee is a fixed fee to stream images for a predetermined amount of time.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

What is claimed:

1. An image connection system including:
    an information gathering unit that gathers information on an image to be captured;
    an image requesting unit that requests the capture of a specific image from a plurality of mobile communication devices near a specific geographic location;
    an image routing device that routes an image form at least one mobile communication device to the requesting device
    wherein,
    the image requesting unit receives multiple responses to capture the requested image with the responses including a fee to capture the image, and
    the image requesting unit transmits a request to capture the image based on the proximity of the mobile communication device and the requested fee.

2. The image connection system of claim 1, wherein the image request includes an amount of a fee to be paid to transmit the captured image.

3. The image connection system of claim 2, wherein the image routing unit does not route the image until confirmation of payment of the fee is received.

4. The image connection system of claim 3, wherein the fee is a time based fee to gather a plurality of images.

5. The image connection system of claim 4, wherein the fee is paid after the images are transferred.

6. The image connection system of claim 1 wherein the information gathering unit collects the information from each of the at least one mobile communication devices.

7. The image connection system of clam 1, wherein a first of the at least one mobile communication device rejects the request to the image.

8. The image connection system of claim 1, wherein the image requesting unit transmits the request to multiple mobile communication units at once.

9. The image connection system of claim 1, wherein the image requesting device transmits instructions for a user of the mobile communication device related to the position of the user in relation to an object.

10. The image connection system of claim 1, wherein a user requesting the images selects the mobile device where the request is sent.

11. A method of collecting an image by and image connection system including a processor and a memory, with a program operating in the memory that performs the steps of:
    gathering information on an image to be captured via an information gathering unit;
    requesting the capture of a specific image from a plurality of communication devices at a specific geographic location for a predetermined fee via an image requesting unit;
    routing an image from at least one mobile communication device to the requesting device via an image routing unit
    wherein,
    the image requesting unit receives multiple responses to capture the requested image with the responses including a fee to capture the image, and
    the image requesting unit transmits a request to capture the image based on the proximity of the mobile communication device and the requested fee.

12. The method of claim 11, wherein the image request includes an amount of a fee to be paid to transmit the captured image.

13. The method of claim 12, including the step of not transmitting the fee until confirmation of payment of the fee is received.

14. The method of claim 13, wherein the fee is a time based fee to gather a plurality of images.

15. The method of claim 14, wherein the fee is paid after the images are transferred.

16. The method of claim 11 including the step of the information from each of the at least one mobile communication devices.

17. The method of clam 11, wherein a first of the at least one mobile communication device rejects the request to the image.

18. The method of claim 11, including the step of transmitting the request to multiple mobile communication units at once.

19. The method of claim 11, including the step of transmitting instructions for a user of the mobile communication device related to the position of the user in relation to an object.

20. The method of claim 11, wherein a user requesting the images selects the mobile device where the request is sent.

* * * * *